US010023969B2

(12) United States Patent
Cummings et al.

(10) Patent No.: US 10,023,969 B2
(45) Date of Patent: Jul. 17, 2018

(54) PLATING POWER SUPPLY WITH HEADROOM CONTROL AND ETHERCAT INTERFACE

(71) Applicant: APPLIED Materials, Inc., Santa Clara, CA (US)

(72) Inventors: Charles A. Cummings, Kalispell, MT (US); Mikael R. Borjesson, Lakeside, MT (US)

(73) Assignee: Applied Materials, Inc., Santa Clara, CA (US)

( * ) Notice: Subject to any disclaimer, the term of this patent is extended or adjusted under 35 U.S.C. 154(b) by 217 days.

(21) Appl. No.: 15/163,097

(22) Filed: May 24, 2016

(65) Prior Publication Data

US 2017/0342589 A1    Nov. 30, 2017

(51) Int. Cl.
   *C25D 21/12*    (2006.01)
   *H02M 7/02*    (2006.01)

(52) U.S. Cl.
   CPC .............. *C25D 21/12* (2013.01); *H02M 7/02* (2013.01)

(58) Field of Classification Search
   CPC ................................ C25D 21/12; H02M 7/02
   See application file for complete search history.

(56) References Cited

U.S. PATENT DOCUMENTS

| 6,632,344 B1 | 10/2003 | Goldberg et al. |
| 6,911,136 B2 | 6/2005 | Zheng et al. |
| 2013/0075264 A1* | 3/2013 | Cummings ............ C25D 21/12 205/83 |

* cited by examiner

*Primary Examiner* — Bryan D. Ripa
*Assistant Examiner* — Ho-Sung Chung
(74) *Attorney, Agent, or Firm* — Perkins Coie LLP; Kenneth H. Ohriner

(57) ABSTRACT

A system for controlling the operation of apparatus for electroplating semiconductor substrates includes operating in a high mode of operation in which an off-the-shelf power supply provides current or voltage that is directly used to produce the channel control signal and in a low mode of operation in which the off-the-shelf power supply biases a circuit that provides a current or voltage to produce the channel control signal.

7 Claims, 4 Drawing Sheets

PLATING POWER SUPPLY WITH HEADROOM CONTROL AND ETHERCAT INTERFACE

BACKGROUND OF THE INVENTION

The field of the invention is apparatus for electroplating substrates, such as silicon wafers and similar substrates, and power supplies and controllers providing electrical power to electrodes in substrate electroplating apparatus.

In manufacturing micro-scale semiconductor and similar devices, process control equipment must meet requirements that are more demanding in comparison to most other industries. This results primarily because process parameters must be very closely controlled to successfully manufacture microelectronic devices. For example, in certain applications, it is important that a metal layer plated onto a substrate have uniform thickness over all areas of the substrate. Achieving a uniform plating profile or thickness requires precise control of electrical current provided via electrodes in the electroplating apparatus.

Electroplating apparatus in semiconductor manufacturing have used control systems similar to those used in other plating industries. Generally, these control systems include a combination of analog circuitry, and micro-controllers, or DSPs (digital signal processors), to read process parameters and close the feedback loop, allowing the system to produce the desired plating profile. These known control systems have met with varying degrees of success. Accordingly, there is a need for improved control systems and control methods.

BRIEF DESCRIPTION OF THE DRAWINGS

In the drawings, the same reference number indicates the same element in each of the views.

DETAILED DESCRIPTION

Electroplating is a process in which an electrical current or voltage signal is used to control deposition of a metal or metallic compound on a surface of a substrate. Electroplating is used in many applications, including, for example, fabrication of integrated circuits. In such application, high accuracy of metal deposition rates and geometries is desirable. This requires accurately controlling electroplating current, especially as microelectronic components on semiconductor substrate components continue to become smaller.

Electroplating current may be advantageously controlled digitally, or via a programmable controller. A programmable output may be used to optimize the plating rate. Semiconductor fabrication equipment may be used to manufacture various products. A programmable controller allows the equipment to be readily used to electroplate different products. Some fabrication equipment have two or more anodes, a cathode connected to the wafer or substrate, and optionally a thief electrode. In this equipment, the programmable controller must simultaneously control multiple channels, presenting a further engineering challenge.

Electroplating equipment also preferably has the capability to accurately control a wide dynamic range of the output current. An electroplating system often is expected to provide a wide range of output current, to provide effective control of the electroplating. The currents required for plating processes vary over a wide range, milliamps to 10 s of amps for example.

Figure 1:
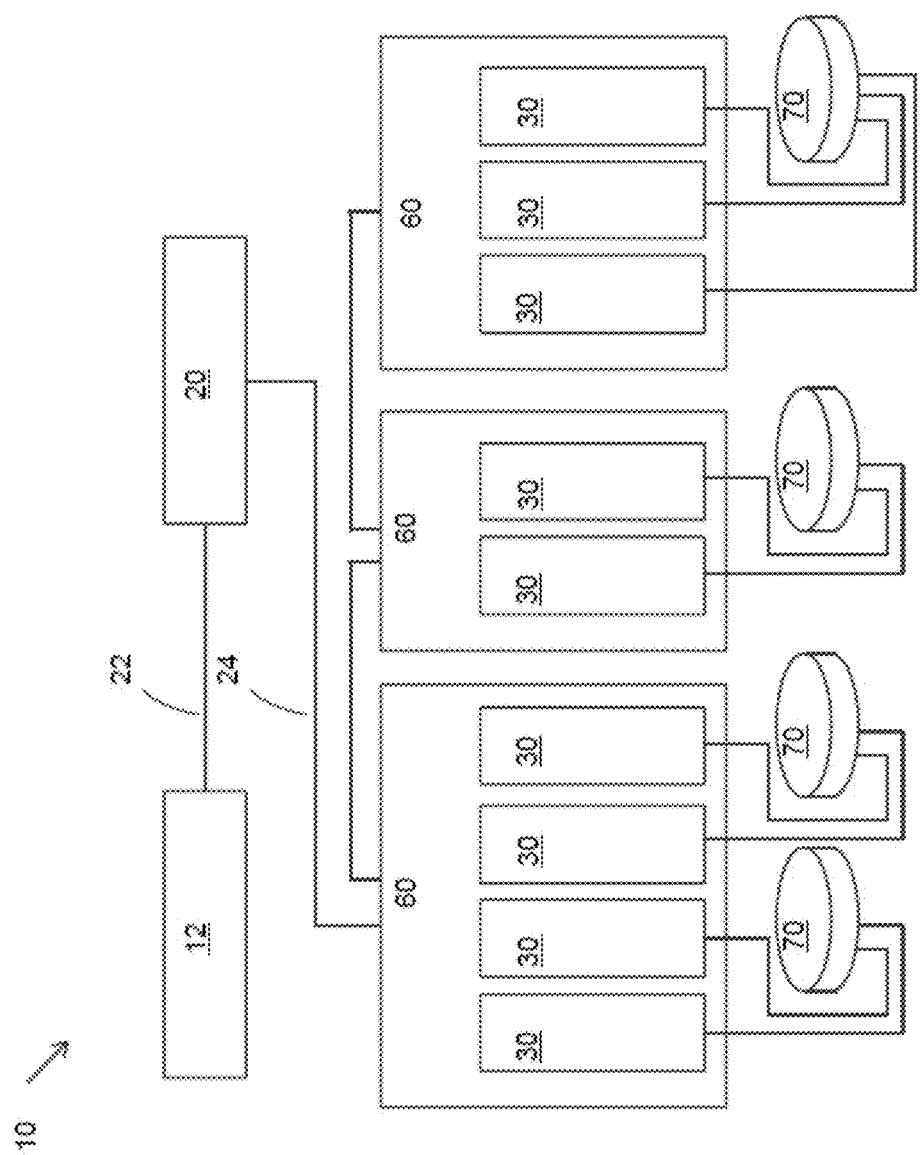
FIG. 1 is a block diagram of an example of an electrical control system of an electroplating apparatus.

As shown in FIG. 1, an electroplating apparatus 10 includes a user interface computer 12 and Plating Control Computer 20 with EtherCAT interface 24 and Ethernet interface 22. A single Plating Control Computer can communicate with one or more plating subsystems 60 over the EtherCAT interface. The Ethernet interface is used for equipment communications that are not as time-critical, such as communications to a separate user interface computer. Each plating subsystem controls one or more anodes in a plating chamber.

Each plating subsystem 60 has one or more channels 30, each connected to a zone in a plating chamber 70. Multiple plating chamber zones may be used to control radial plating uniformity on the substrate. For brevity, the plating subsystem 60 components are be referred to herein as a PPS (Plating Power Supply assembly). FIG. 1 shows three different sample PPS configurations. The first PPS configuration shows four channels, which are connected to support two plating chambers 70 using two channels per plating chamber. The second example shows a PPS configuration with two channels to support a single plating chamber. The third sample shows a PPS configuration with three channels to support a plating chamber with three channels per plating chamber.

Plating potential for each channel is produced by an AC to DC power block 32 with adjustable DC output. These use a switch mode output for good efficiency at high currents. Typically, the AC to DC power block has difficulty operating all the way to 0 V, which makes operation at low currents problematic.

The Control board 40 includes circuitry to interface between the AC to DC power block and the EtherCAT interfaces. Operating the AC to DC power block may include communicating, from the Plating Control Computer 20, via an EtherCAT interface, control messages to control operation of the AC to DC power block. The control messages may include a digital control message that specifies whether the output electrical control signal is voltage or current, and an analog control message that specifies the target output electrical control signal values and the corresponding durations.

Figure 2:
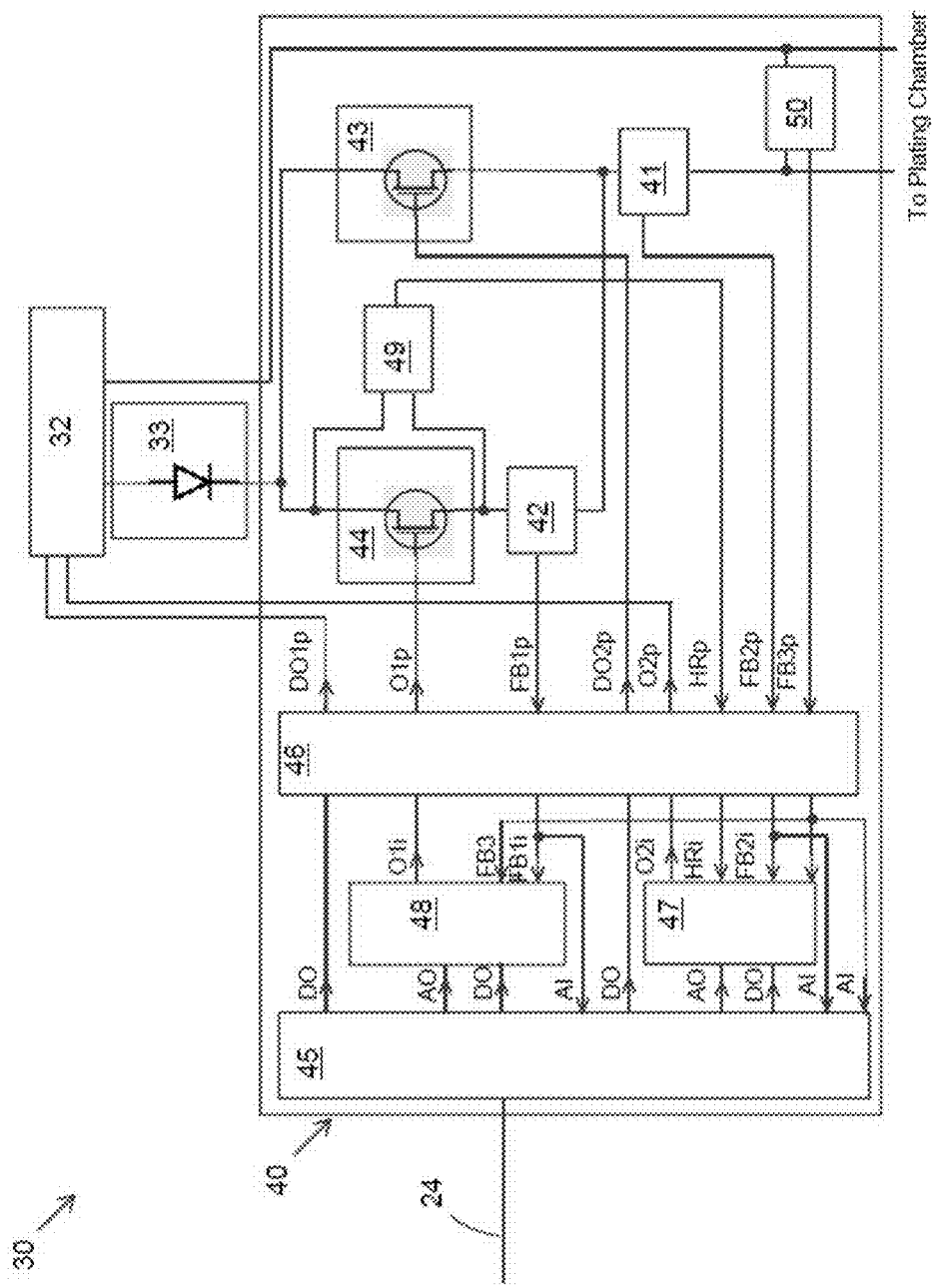
FIG. 2 is a block diagram showing additional elements of the system shown in FIG. 1.

FIG. 2 shows a block diagram for one plating channel 30. The control board may contain components for more than one plating channel. The elements on the control board may be:

[a] One or more current sensors. In order to achieve wider range of plating currents, separate high range current sensor 41 and low range current sensor 42 may be provided, although a single current sensor, or more than two current sensors, may be used.

[b] One or more current switching elements 43 to route current through the High range current sensor 41. The current switching elements 43 may be a MOSFET controlled by a digital output DO2$p$ that turns the transistor(s) on hard for low power dissipation in the switching element(s)

[c] One or more current switching elements 44 to route current through the Low range current sensor 42. These may be controlled by an analog output and a control circuit that puts the transistor(s) in series with the AC to DC power block 32. The transistor functions as a linear step-down regulator.

[d] EtherCAT digital and analog input and output circuitry 45. Software running in the Plating Control Computer 20 controls the plating subsystem 60 by turning on digital outputs, setting analog outputs to control the plating current or voltage set points, and reading back digital inputs and analog inputs to report and record plating process sensor measurements such as current and voltage.

[e] Isolation circuits 46. This optional circuitry is used to prevent electrical interaction between the electroplating power delivery circuits and other interface and control circuits.

[f] Op amp circuits 47 and 48 to provide closed loop control. Circuit 47 controls the AC to DC power block 32. Circuit 48 controls the low range transistor 44. The AC to DC power block typically has an on/off control, which can be controlled by software running in the Plating Control Computer 20 using a digital output DO1$p$.

The apparatus 10 may further include blocking diode(s) 33 to prevent interaction between the AC to DC power blocks when they are connected together in the plating chamber. It is sometimes desirable to simultaneously plate in some zones and de-plate in a different zone. If a zone is designed for de-plate, the diode 33 would be reversed and polarity of the voltage coming from the AC to DC power block would be reversed.

System Operation Examples

The operator enters the desired, or target, plating process into the user interface computer 12. This generally includes the desired mode (such as voltage or current), set point (such as 2.5 Amps) and duration (such as 1 minute) to be used by channel of the plating system. The desired process is sent to the Plating Control Computer 20 which controls the time sensitive electroplating operations of the equipment, including electroplating.

The semiconductor processing equipment brings the substrate to the plating chamber 70 and immerses it in plating solution, typically via a robot. Software in the Plating Control Computer controls the PPS by sending EtherCAT commands to turn on digital and analog outputs in the PPS to communicate the desired settings. The digital outputs DO control the operating mode (current or voltage), range (high or low range current, for example) and power delivery state (on or off). The analog output(s) AO represent the desired set point current or voltage that the PPS should deliver. The Plating Control Computer 20 has calibration tables for each channel, mode, and range of each PPS that are used to communicate the desired set point (plating current in amps, for example) taking into consideration the calibration results for each specific channel. The methods described may include looking up a calibration table to obtain, from the control messages received on the EtherCAT interface, a corresponding operating point for an electrical circuit that generates the output electrical control signal. A calibration table, stored either in the plating control computer or in the plating subsystem 60, is used to translate the user programmed set point in amps or volts to corresponding operational set points for the control circuit. This translation could either happen in the plating control computer where the EtherCAT interface message is a calibrated set point (DAC counts for example), or it could happen in the plating subsystem where the EtherCAT interface message is a target amps or volts.

If the PPS has multiple current sensors, software running in the Plating Control Computer 20 determines which range should be used for each step of the process based on the desired set point and the minimum operating range of the AC to DC power block. When, for example, using the high range is appropriate, the control to route current through the high range sensor 41 is selected, and the control input to route current through the low range sensor 42 is turned off.

Circuits on the Control board use well-established techniques (such as proportional, integral and derivative control or PID control) to drive the control pin of the AC to DC power block to make the feedback signal match the set point signal. For example, to implement the I-term of a PID control for high range current control mode, the circuit 47 would be configured to produce a control output $O2i=k_2 f(A0-FBi)$, where $FBi=FB2i$, the high range current feedback signal from the high range current sensor 41 and A0 is the set point signal from the Plating Control Computer 20. If a digital output (DO) signals that voltage control mode should be used instead of current mode, $FBi=FB3i$, the voltage feedback signal FB3$i$ from the feedback sensing circuit 50. Circuit 47 can use operation amplifiers and analog multiplexers to produce the desired control signal. The first and second, or high and low range current sensors, may generate a feedback signal indicative of magnitude of the output electrical control signal during high and low range operation, respectively.

Circuits 47 and 48 could be implemented on either side of the isolation circuits 46. In the initial implementation they were on the isolated side.

When the PPS is asked to deliver current mode with currents that are below the minimum operating range of the AC to DC power block or where the low range current control circuit is expected to provide more accurate plating results, the PPS control signal that routes current through the low range sensor 42 is selected, and the control signal DO2$p$ that routes current through the high range sensor 41 is turned off.

In this mode, two separate control loops are used. One loop is in circuit 47 which controls the AC to DC power block to provide a fixed drain-to-source voltage ("headroom voltage") to the low range transistor 44. In this mode, circuit 47 uses the headroom voltage sensing circuit 49 to provide an output $O2i=k_{hr}f(k_{HRnorm}-HRi)$ control signal to the AC to DC power block 32. $k_{HRnorm}$=the desired headroom voltage for normal operation of the transistor and HRi=the measured headroom voltage.

The second loop from circuit 48 controls the low range transistor 44, which acts as a post-regulator for the AC to DC power block and directs its output to a current sensor optimized for lower currents.

The circuit 48 uses well established control techniques for control. So, for example, to implement the I-term of a PID control for low range current control mode $O1i=k_1 f(A0-FBi)$ where $FBi=FB1i$, the low range current sensor reading and A0 is the set point signal from the Plating Control Computer 20.

The control board contains circuitry to minimize transients when shifting between ranges. For semiconductor plating that changes rates during the plating process, processing normally starts with lower plating currents, then shifts to higher plating currents later in the process. The AC to DC power block produces power for both ranges, but the low range transistor(s) require some voltage drop ("headroom") for proper operation. While operating in low range, this allows the transistor to make adjustments to regulate the current at the desired value even though the AC to DC power block cannot operate accurately (or at all) at the desired output. The AC to DC power block adjustment speed is typically slower than the low range transistor, so it is possible that when switching from low range to high range, the headroom that is desirable for low range operation might be set such that the AC to DC power block is producing a higher current than desired for a subsequent high range step. For example, if the low range current is 2.0 amps and the high range current is 2.5 amps with a load of 1 ohm and headroom of 3 volts, the PPS output voltage required is 2×1=2 V. The output of the AC to DC power block to achieve a 3V headroom would be 2+3=5V. If the unit switched immediately to high range, the expected current would be 5V/1 ohm=5 A, higher than the desired 2.5 A set point. This would result in a current spike above the desired set point until the AC to DC power block adjusts its output down to the level needed for the high range current step.

Many semiconductor electroplating processes are more sensitive to currents above set point than below set point. To reduce the potential for current above the desired set point during the range transition, separate control DACs and circuits for high and low range current control may be used. Also, circuits to select the desired headroom for low range mode may be provided. The normal headroom setting $k_{HRnorm}$ provides more margin for the low range transistor to control the output. Just prior to changing to high range mode, a lower headroom setting $k_{HRmin}$ can be selected. This reduces the output of the AC to DC power block to a minimal headroom level (reducing the margin for the low range transistor to control the output in response to load changes). Then when the PPS controller changes to high range, the system is less likely to overshoot the desired set point.

In low range mode, the low range transistors can respond more quickly to changes than the AC to DC power blocks. Circuits may be designed to react more quickly to the "above set point" condition than the "below set point" condition, which is often desirable both from the process standpoint, and also to protect the low range transistors from damage due to power dissipation limits. Additionally, the I term (integral term) of the control circuit response speed automatically slows when headroom drops below a threshold level. This allows fast response when sufficient headroom is available, but slows the response down to follow the AC to DC power block response when there is insufficient headroom.

This helps prevent accumulating I-term in the low range control circuit and the subsequent overshoot that would result without this feature.

Example Advantages

The architecture described allows use of low cost, more readily available commercial AC to DC power blocks, even if their output is not adjustable over the entire range required for the application. This eliminates the need for a custom AC to DC power block and reduces system cost.

Using a switching mode AC to DC power block with a linear post-regulator produces a system with a favorable combination of the characteristics. When high currents are needed, the switch mode design gives high efficiency, which reduces size, cost and heat. A less efficient linear post-regulator is used only when low currents are needed, and allows adjustability to 0 V or 0 A output and faster response time within the design's chosen headroom voltage.

By maintaining a known headroom voltage above the low range control transistors, power dissipation in the low range control transistors is reduced, so transistors and heat sinks can be smaller. This reduces system size and cost. Lower temperature also improves transistor life, improving reliability.

Because the EtherCAT protocol insures data is sent and received with a known time delay, timing uncertainty is reduced when compared to other communication protocols which may experience intermittent delay variation. This gives a more repeatable process result.

The EtherCAT interface also makes communications with multiple PPS controllers in a large system quite simple. Circuits in the PPS controller are responsible for closed loop control, so software only needs to control the sequence of process set points and modes.

In embodiments where the PPS controller does not have an internal microprocessor, the disclosed technique eliminates communications protocol issues between PPS controllers and the Plating Control Computer. This simplifies software development, reduces software complexity and development time, improves reliability, and reduces troubleshooting time. Since software complexity is reduced, the Plating Control Computer can either control more channels or a lower performance Plating Control Computer can be utilized, reducing system cost.

Figure 3:
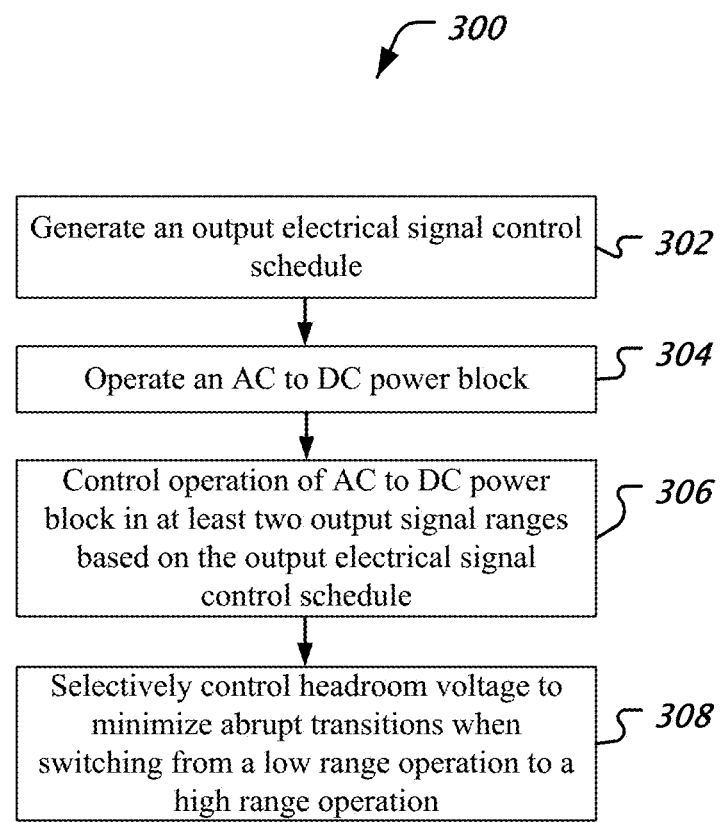
FIG. 3 is a flowchart of an example method of controlling electroplating operation.

FIG. 3 shows an example flowchart of a method 300 of controlling the operation of electroplating a semiconductor substrate.

The method 300 includes, at 302, generating, from a target electroplating process, an output electrical control signal schedule of target output electrical control signal values and corresponding durations.

The method 300 includes, at 304, operating an alternating current (AC) to direct current (DC) power block to generate a DC voltage according to the output control schedule in at least two modes.

The method 300 includes controlling the AC-to-DC power block operation 306 such that in a high mode of operation, the AC-to-DC power block directly provides the output electrical control signal to an electroplating channel and in a low mode of operation, the AC-to-DC power block provides a headroom voltage signal to bias a low range controller transistor stage, and wherein the low range control transistor acts as a post-regulator to control the output electrical control signal to the electroplating channel.

The method 300 includes, at 308, adjusting the headroom voltage to control abrupt variations in the output electrical control signal during transition from the low mode of operation to the high mode of operation. The selective control of the headroom voltage may, for example, be to reduce the headroom voltage momentarily before switching from low mode to high mode of operation to reduce potential overshoot when the high range voltage required is less than the low range prior step+normal headroom.

Figure 4:
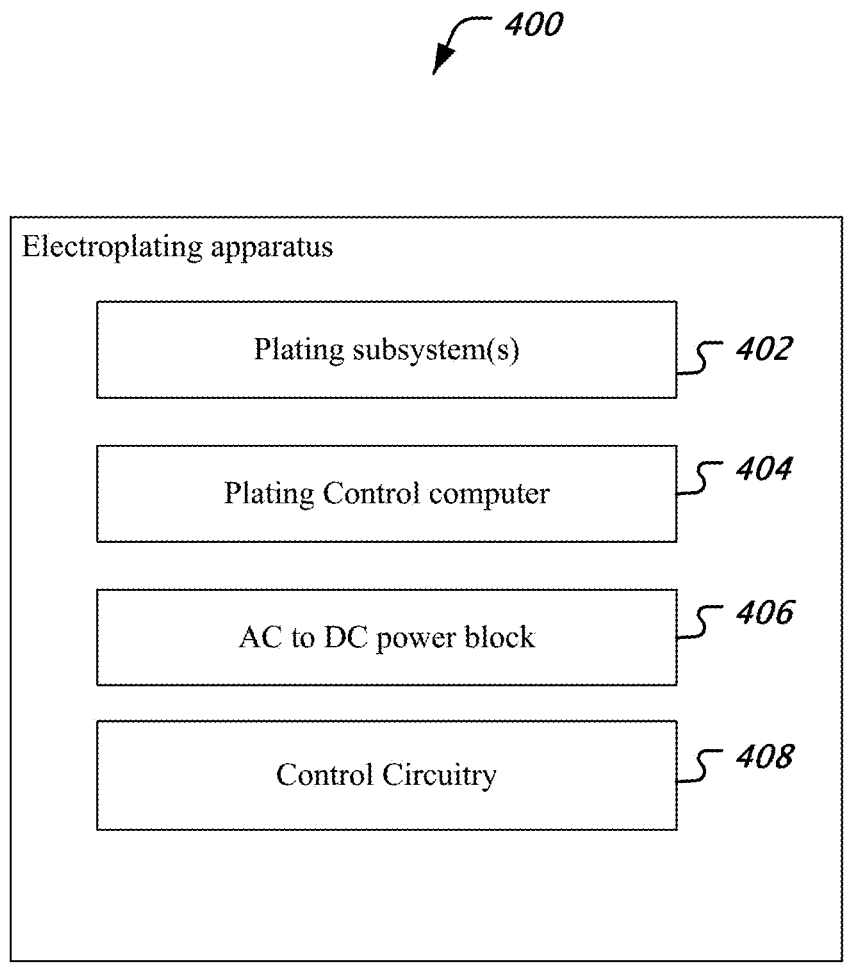
FIG. 4 is a block diagram of an example apparatus for controlling electroplating operation.

FIG. 4 shows an example electroplating control apparatus 400 which may be used to control electroplating of semiconductor substrates.

The apparatus 400 includes one or more plating subsystems (402), each of the one or more plating subsystems comprising one or more channels that produce a controlled amount of electrical control signal to drive electroplating operation of individual zones (typically anodes) of a plating chamber used for electroplating a semiconductor wafer according to a schedule. In some embodiments, the plating subsystems 402 may be similar to the plating subsystems 60 described above.

The apparatus 400 includes a plating control computer 404 coupled with the one or more plating subsystems via an EtherCAT interface, the plating control computer providing the schedule. In some embodiments, the plating control computer 404 may be similar to the plating control computer 20 described above.

The apparatus 400 includes an alternating current (AC) to direct current (DC) power block (406) with adjustable output that provides plating potential for each channel. In some embodiments, the AC to DC power block may be similar to the AC to DC power block 32 described herein.

The apparatus 400 includes a control circuit 408 that provides an electrical interface between the EtherCAT interface and the AC to DC power block to enable operation of the AC to DC power block according to the schedule received from the EtherCAT interface, the control circuit including one or more current sensors, one or more current switching elements, and an isolation circuit disposed to prevent electrical interaction between the plating control computer and the EtherCAT interface, I.e., to isolate them from each other. In some embodiments, the control circuit 408 may be embodied as the control board 40 described herein.

The one or more plating subsystems are operable in a high mode of operation in which the AC to DC power block is directly providing a first output electrical control signal and a low mode of operation in which the AC to DC power block biases a low range control transistor that acts as a post-regulator to the AC to DC power block and provides a second output electrical control signal that is smaller in magnitude than the first output electrical control signal.

In some embodiments, a method for controlling the electroplating apparatus includes producing a linear variable electrical output signal from a variable output direct current (DC) power supply that exhibits linear operation when outputting voltage above a threshold, and nonlinear operation when outputting voltage below the threshold, using an electrical switch to selectively operate one of a high range circuit and a low range circuit to output the linear variable electrical output signal in a high range and a low range respectively. In the high range, the linear variable electrical output signal is generated by directly using output of the DC power supply. In the low range, the linear variable electrical output signal is generated by controlling the DC power supply to maintain a constant drain-to-source voltage to a transistor, and using the transistor as a post regulator for the DC power supply. The method may further include reducing the constant value momentarily before switching from the low range circuit to the high range circuit to control abrupt variations in the output electrical control signal.

Various embodiments and techniques have been described for precise and linear control of electroplating current using an off-the-shelf power block which may not be linear throughout the entire range. In some embodiments, the precise control is achieved by using electrical switching between at least two operations modes—a high mode which corresponds to a linear range of operation of the DC power block, and a low mode in which the output of DC power block is linearly regulated using a transistor circuit to produce variable, linear low range output current. The transition between the low mode and high mode may be carefully controlled by adjusting the DC power block output momentarily before switching to minimize current swings during the transition. The transition between the high mode of operation and the low mode of operation may be selected to occur at an operational point of the AC to DC power block below which the AC to DC power block exhibits non-linearity of operation. The system with high and low ranges advantageously has better accuracy and response at low set points than a system with only a single range.

The AC to DC power block may include multiple individually operable power supply units, and a diode may be provided to prevent electrical interaction between the power supply units.

Thus, novel apparatus and methods have been shown and described. Various changes and substitutions may of course be made without departing from the spirit and scope of the invention. The invention, therefore, should not be limited, except by the following claims and their equivalents.

The invention claimed is:

1. An electroplating control apparatus, comprising:
   one or more plating subsystems, each of the one or more plating subsystems comprising one or more channels that produce a controlled amount of electrical control signal to drive electroplating operation of individual zones of a plating chamber used for electroplating semiconductors according to a schedule;
   a plating control computer coupled with the one or more plating subsystems via an EtherCAT interface, the plating control computer providing the schedule;
   an alternating current (AC) to direct current (DC) power block with adjustable output that provides plating potential for each channel;
   a control circuit that provides an electrical interface between the EtherCAT interface and the AC to DC power block to enable operation of the AC to DC power block according to the schedule received from the EtherCAT interface, the control circuit including one or more current sensors, one or more current switching elements, and an isolation circuit disposed to prevent electrical interaction between the plating control computer and the EtherCAT interface;
   wherein the one or more plating subsystems are operable in a high mode of operation in which the AC to DC power block is directly providing a first output electrical control signal and a low mode of operation in which the AC to DC power block biases a low range control transistor that acts as a post-regulator to the AC to DC power block and provides a second output electrical control signal that is smaller in magnitude than the first output electrical control signal.

2. The apparatus of claim 1, wherein:
   the one or more electric sensors are coupled to the first output electrical control signal and the second output electrical control signal for sensing actual output electrical control signal output of the apparatus.

3. The apparatus of claim 2, wherein the output electrical control signal is an electric current signal.

4. The apparatus of claim 1, further including:
   an electrical isolation circuit disposed between the EtherCAT interface and the output electrical control signal to electrically isolate the EtherCAT interface from the output electrical control signal.

5. The apparatus of claim 1, wherein the plating control computer includes a memory having a calibration table stored therein, the calibration table including entries for translating between messages from the EtherCAT interface and corresponding operational set points for the control circuit.

6. The apparatus of claim 1, wherein the AC to DC power block includes multiple individually operable power supply units, and wherein the apparatus further includes:
   one or more diodes to prevent electrical interaction between the power supply units during operation.

7. The apparatus of claim 1, wherein a transition between the high mode of operation and the low mode of operation is selected to occur at an operational point of the AC to DC power block below which the AC to DC power block exhibits non-linearity of operation.

* * * * *